US010189710B2

(12) United States Patent
Lipp

(10) Patent No.: US 10,189,710 B2
(45) Date of Patent: Jan. 29, 2019

(54) METHOD OF PURIFYING PHOSPHORIC ACID

(71) Applicant: BATEMAN ADVANCED TECHNOLOGIES LTD., Yokneam (IL)

(72) Inventor: Jonathan Lipp, Givat Avni (IL)

(73) Assignee: TENOVA ADVANCED TECHNOLOGIES LTD., Hi-Tech Park, Yokneam (IL)

(*) Notice: Subject to any disclaimer, the term of this patent is extended or adjusted under 35 U.S.C. 154(b) by 0 days.

(21) Appl. No.: 15/110,745

(22) PCT Filed: Jan. 18, 2015

(86) PCT No.: PCT/IB2015/050369
§ 371 (c)(1),
(2) Date: Jul. 10, 2016

(87) PCT Pub. No.: WO2015/107500
PCT Pub. Date: Jul. 23, 2015

(65) Prior Publication Data
US 2016/0332879 A1  Nov. 17, 2016

(30) Foreign Application Priority Data

Jan. 20, 2014  (GB) .................. 1400876.7

(51) Int. Cl.
*C01B 25/237*  (2006.01)
*C01B 25/234*  (2006.01)
(52) U.S. Cl.
CPC ........ *C01B 25/2377* (2013.01); *C01B 25/234* (2013.01)

(58) Field of Classification Search
CPC . B01D 61/027; C01B 25/234; C01B 25/2208; C01B 25/223; C01B 25/225
See application file for complete search history.

(56) References Cited

U.S. PATENT DOCUMENTS

| 4,070,443 A * | 1/1978 | Kikuchi ................ C01B 25/234 423/321.1 |
| 4,857,211 A * | 8/1989 | Nineuil ................ C01B 25/2208 134/3 |
| 5,945,000 A * | 8/1999 | Skidmore ............ B01D 61/027 210/650 |

FOREIGN PATENT DOCUMENTS

KR  20060011699 A1  2/2006

OTHER PUBLICATIONS

Gonzalez et al. "Purification of phosphoric acid solutions by reverse osmosis and nanofiltration"Desalination, 147 (2002) 315-320.*
International Search Report for PCT/IB2015/050369, dated Apr. 21, 2015.
Written Opinion for PCT/IB2015/050369, dated Apr. 21, 2015.
(Continued)

*Primary Examiner* — Amber R Orlando
*Assistant Examiner* — Syed T Iqbal
(74) *Attorney, Agent, or Firm* — Marc Van Dyke; Fourth Dimension IP

(57) ABSTRACT

A method of purifying phosphoric acid solution produced in wet process using nanofiltration. The claimed method contains the following: (a) providing wet phosphoric feed (b) subjecting the said feed to a first nanofilter (c) produce sulfate solids (d) removing the solids (e) subjecting a second nanofilter.

20 Claims, 2 Drawing Sheets

(56) References Cited

OTHER PUBLICATIONS

Effect of phosphoric and hydrofluoric acid on the structure and permeation of a nanofiltration membrane; M.P. González, I. Saucedo, R. Navarro, P. Prédanos, L. Palacio, F. Martínez, A. Martín, A. Hernández; J Membrane Sci 281, 177-185; Sep. 30, 2006.
Purification of phosphoric acid solutions by reverse osmosis and nanofiltration; M.P. González, R. Navarro, I. Saucedo, M. Avila, J. Revilla, C. Bouchard; Dec. 31, 2002.
KR 100600641; Machine Translation (by EPO and Google)—published Jul. 14, 2006—Dongwoo Fine Chem Co Ltd.

* cited by examiner

US 10,189,710 B2

METHOD OF PURIFYING PHOSPHORIC ACID

This application draws priority from UK Patent Application No. GB1400876.7, filed Jan. 20, 2014, which is incorporated by reference for all purposes as if fully set forth herein.

FIELD AND BACKGROUND OF THE INVENTION

The present invention relates to methods for purifying wet phosphoric acid using nanofiltration.

In wet phosphoric acid processing, phosphoric acid may be produced from phosphate rock (containing fluorapatite, or $3Ca_3(PO_4)_2 \cdot CaF_2$). The phosphate rock may be attacked by concentrated sulfuric acid in a series of well-stirred reactors to produce phosphoric acid and calcium sulfate (gypsum) along with other insoluble impurities. The solids, primarily including gypsum, are separated off from the phosphoric acid. Fluoride may be removed at a further stage, e.g., as $H_2SiF_6$. Organic and inorganic solvents can be used to remove metallic and organic impurities. The purified phosphoric acid stream is then subjected to concentration by evaporation to produce commercial, merchant or food grade phosphoric acid.

The present inventors have recognized a need for improved methods for purification of wet phosphoric acid.

SUMMARY OF THE INVENTION

According to the teachings of the present invention there is provided a method of purifying phosphoric acid including: (a) providing a wet phosphoric acid feed containing: (i) 2-62% phosphoric acid, expressed as a percent weight of $P_2O_5$ in the feed; (ii) a sulfate concentration of at least 15 ppm per each 1 percent weight of the $P_2O_5$ in the feed; and (iii) metallic impurities, including iron, aluminum, calcium, magnesium, and chromium, being at least 10 ppm per each 1 percent weight of the $P_2O_5$ in the feed; (b) subjecting the wet phosphoric acid feed to a first nanofilter in a first nanofiltration stage, to obtain a first permeate and a first reject; (c) treating the first permeate to produce sulfate solids in a partially treated phosphoric acid stream; (d) removing at least a portion of the solids from the phosphoric acid stream; and (e) passing the phosphoric acid stream through an additional nanofilter in at least one additional nanofiltration stage, to obtain a purified phosphoric acid in a second permeate, and a second reject, the second permeate containing: (i) a concentration of 2-62% phosphoric acid, expressed as a percent weight of $P_2O_5$ in the second permeate; (ii) a sulfate concentration of less than 10 ppm per each 1 percent weight of the $P_2O_5$ in the second permeate; and (iii) metallic impurities including iron, aluminum, calcium, magnesium, and chromium, a total concentration of the iron, aluminum, calcium, magnesium, and chromium being less than 5 ppm per each 1 percent weight of the $P_2O_5$ in the second permeate.

According to further features in the described preferred embodiments, the wet phosphoric acid feed further contains a total organic carbon (TOC) concentration of at least 5 ppm per each 1 percent weight of $P_2O_5$ in the purified phosphoric acid.

According to still further features in the described preferred embodiments, the purified phosphoric acid contains a sulfate concentration of at most 8 ppm, at most 6 ppm, at most 5 ppm, at most 4 ppm, at most 3 ppm, or at most 2.5 ppm per each 1 percent weight of $P_2O_5$ in the purified phosphoric acid.

According to still further features in the described preferred embodiments, the total concentration of the iron, aluminum, calcium, magnesium, and chromium in the second permeate is at most 4 ppm, at most 3 ppm, at most 2.5 ppm, at most 2 ppm, at most 1 ppm, or at most 0.8 ppm per each 1 percent weight of $P_2O_5$ in the purified phosphoric acid.

According to still further features in the described preferred embodiments, the purified phosphoric acid contains a total organic content concentration of at most 3 ppm, at most 2 ppm, at most 1.5 ppm, at most 1.2 ppm, at most 1 ppm, at most 0.8 ppm, or at most 0.7 ppm per each 1 percent weight of $P_2O_5$ in the purified phosphoric acid.

According to still further features in the described preferred embodiments, the treatment includes contacting the first permeate with a barium salt to precipitate the sulfate solids.

According to still further features in the described preferred embodiments, the barium salt includes, predominantly includes, or consists essentially of barium carbonate.

According to still further features in the described preferred embodiments, the operating temperature of at least one of the first and additional nanofiltration stages is within a range of 20° C. to 60° C.

According to still further features in the described preferred embodiments, the operating temperature of at least one of the first and additional nanofiltration stages is within a range of 25° C. to 60° C., 30° C. to 60° C., 30° C. to 55° C., 30° C. to 50° C., or 25° C. to 40° C.

According to still further features in the described preferred embodiments, at least one of the first and additional nanofiltration stages is operated at a pressure within a range of 30 to 80 bar, 35 to 80 bar, or 40 to 80 bar.

According to still further features in the described preferred embodiments, the wet phosphoric acid feed contains at least 20%, 25%, 30%, 40%, 50%, 55%, 60%, or 61.5% $P_2O_5$, by weight.

According to still further features in the described preferred embodiments, the purified phosphoric acid contains at least 20%, 25%, 30%, 40%, 50%, 55%, 60%, or 61.5% $P_2O_5$, by weight.

According to still further features in the described preferred embodiments, the purified phosphoric acid contains, following the nanofiltration steps and prior to any concentration step, within at most 4%, at most 3%, at most 2%, or at most 1% $P_2O_5$, by weight, of the $P_2O_5$ content, by weight, in the wet phosphoric acid feed.

According to still further features in the described preferred embodiments, a backwashing operation is performed on at least one of the first nanofilter and the additional nanofilter.

According to still further features in the described preferred embodiments, the backwashing operation is performed by reverse feeding the purified phosphoric acid through the additional nanofilter or through the first nanofilter.

According to still further features in the described preferred embodiments, the backwashing operation is performed by reverse feeding the first permeate through the first nanofilter.

According to still further features in the described preferred embodiments, the backwashing operation is performed after a maximum time of six hours of operation of at least one of the first and additional nanofiltration stages.

According to still further features in the described preferred embodiments, the backwashing operation is performed for a minimum of 5 minutes per six hours of operation of at least one of the nanofiltration stages.

According to still further features in the described preferred embodiments, the first nanofilter and the second nanofilter undergo the backwashing operation within each 4 to 6 hours, 2 to 6 hours, 2 to 5 hours, or 2 to 4 hours of the operation of at least one of the first and additional nanofiltration stages.

According to still further features in the described preferred embodiments, the first reject is returned to a process step prior to step (b).

According to still further features in the described preferred embodiments, the second reject is returned to a process step prior to step (d).

According to still further features in the described preferred embodiments, the purified phosphoric acid is further concentrated after the second nanofiltration stage.

According to still further features in the described preferred embodiments, the composition of the wet phosphoric acid feed contains 25-55% $P_2O_5$, 1000 to 3000 ppm calcium, 1000 to 3000 ppm magnesium, 1000 to 4000 ppm aluminum, 1000 to 3000 ppm sulfate, 100 to 500 ppm total organic carbon, 500 to 3000 ppm iron, and 50 to 500 ppm chromium.

According to still further features in the described preferred embodiments, the composition of the second permeate contains 30-55% $P_2O_5$, 5 to 15 ppm calcium, 5 to 15 ppm magnesium, 1 to 3 ppm aluminum, 50 to 120 ppm sulfate, 10 to 60 ppm total organic carbon, 1 to 4 ppm iron, 1 to 2 ppm chromium, and at most 1 ppm cadmium.

According to still further features in the described preferred embodiments, the purified phosphoric acid contains a sulfate concentration of at least 1 ppm, at least 1.2 ppm, at least 1.5 ppm, or at least 1.7 ppm, per each 1 percent weight of $P_2O_5$ in the second permeate.

According to still further features in the described preferred embodiments, the second permeate contains at most 0.05 ppm, at most 0.04 ppm, at most 0.035 ppm, at most 0.03 ppm, at most 0.025 ppm, or at most 0.02 ppm of barium, per each 1 percent weight of $P_2O_5$ in the second permeate.

According to still further features in the described preferred embodiments, the composition of the wet phosphoric acid feed contains 20-60% $P_2O_5$, and at least one of: 1000 to 3000 ppm calcium, 1000 to 3000 ppm magnesium, 1000 to 4000 ppm aluminum, 1000 to 3000 ppm sulfate, 100 to 500 ppm total organic carbon, 500 to 3000 ppm iron, and 50 to 500 ppm chromium.

According to still further features in the described preferred embodiments, the second permeate contains 30-55% of said $P_2O_5$, at most 15 ppm of said calcium, at most 15 ppm of said magnesium, at most 3 ppm of said aluminum, and at most 120 ppm of said sulfate.

According to still further features in the described preferred embodiments, the second permeate contains at most 60 ppm of said total organic carbon.

According to still further features in the described preferred embodiments, the second permeate contains at most 4 ppm iron, at most 2 ppm chromium, or at most 1 ppm cadmium.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1:
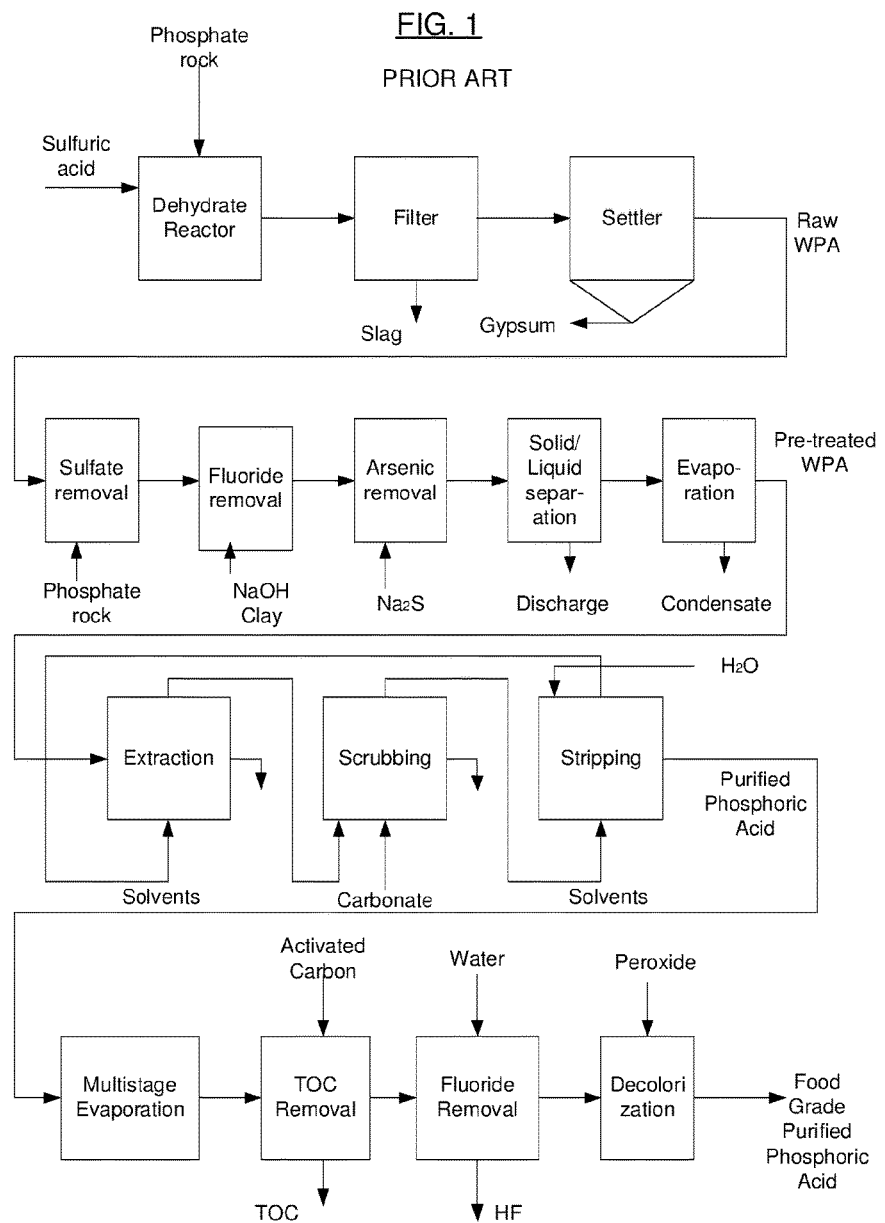
FIG. 1 is a system block diagram of a prior art wet phosphoric acid purification process.

The principles and operation of the wet phosphoric acid purification process using nanofilters, according to some embodiments of the present invention, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 is a system block diagram of a prior art wet phosphoric acid purification process. In a first stage, phosphate rock, such as apatite, is attacked by sulfuric acid. The precipitate, containing gypsum and various solid impurities, is removed. The resultant raw wet phosphoric acid (WPA) is then subjected to further processing, which may include the addition of more phosphate rock to remove sulfate, clay and lye to remove fluoride (as $Na_2SiF_6$), and sodium sulfide to remove arsenic. After solid/liquid extraction and evaporation, a partially treated wet phosphoric acid (WPA-PT) results, which may typically have a phosphoric acid concentration of 25-60% $P_2O_5$, by weight.

In a secondary treatment stage, the partially treated wet phosphoric acid may be sequentially attacked, cleaned and stripped. This may be achieved, for example, by means of liquid extraction using organic solvents, or re-injection (feedback) of dilute purified phosphoric acid. The secondary treatment stage may typically be carried out in successive stirring reactor/settler steps. The output from the secondary treatment stage is a purified phosphoric acid (PPA) of approximately 25-45% $P_2O_5$ by weight. In a subsequent, tertiary stage, the purified phosphoric acid is subjected to concentration, typically in one or more evaporation steps; total organic carbon (TOC) removal using activated carbon; fluoride removal by means of at least one cycle of water addition followed by evaporation; and a decolorization step using peroxide. The product of the tertiary stage is typically a high-quality phosphoric acid containing about 61.5% $P_2O_5$, by weight.

Figure 2:
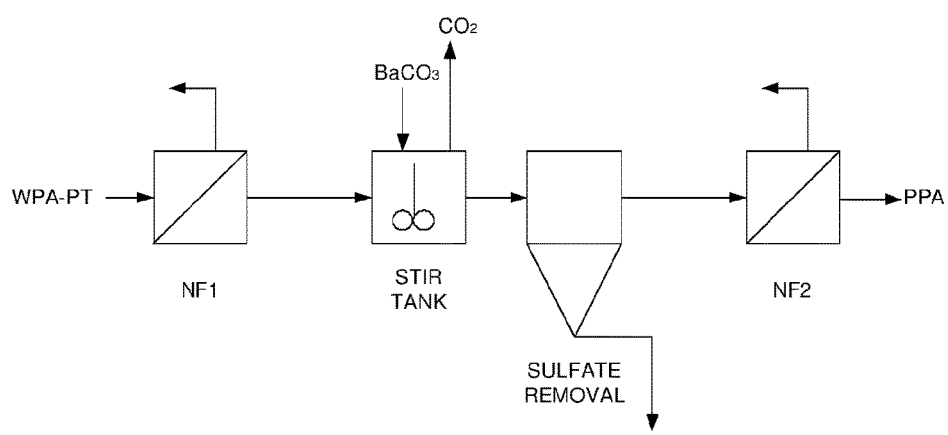
FIG. 2 is a simplified process diagram of a wet phosphoric acid purification process using nanofilters disposed in series, according to one embodiment of the present invention.

FIG. 2 is a system block diagram of a wet phosphoric acid purification process using nanofilters disposed in series, according to one embodiment of the present invention. The process provided in FIG. 2 may substantially replace the secondary stage and eliminate some elements of the tertiary stage of the prior art process provided in FIG. 1. Thus, the feed stream to the inventive process may be a pre-treated wet phosphoric acid. The pre-treated wet phosphoric acid may contain a concentration from 2% to 62% $P_2O_5$ by weight, and more typically, from 25% to 45% $P_2O_5$ by weight. An exemplary pre-treated wet phosphoric acid composition is given in Table 1. The $P_2O_5$ concentration is presented as a range of weight percent, while concentrations of various other components are presented as typical maximum levels, in ppm.

TABLE 1

Exemplary Pre-treated Wet Phosphoric Acid Composition

| $P_2O_5$ w/w % | TOC ppm | Ca ppm | Fe ppm | Al ppm | Mg ppm | Cd ppm | Cr ppm | As ppm | F ppm | Pb ppm | $SO_4$ ppm |
|---|---|---|---|---|---|---|---|---|---|---|---|
| 25-45 | 300 | 2000 | 2500 | 3000 | 2500 | 10 | 100 | <1 | <1 | <1 | 2000 |

The pre-treated wet phosphoric acid may be introduced to a first nanofiltration stage (NF1) in which the feed stream to the nanofilter has a super-osmotic pressure. The temperature may be at least 15° C., 20° C., or 25° C. The reject from the first nanofilter may be fed back to an earlier stage of the process, e.g., to the original feed solution, and the permeate from the first nanofilter may then be subjected to further processing.

Using the exemplary pre-treated wet phosphoric acid composition from Table 1 as the actual feed stream, the composition of the first permeate discharged from the first nanofiltration stage is exemplified in Table 2.

TABLE 2

Exemplary First Permeate Composition -- 1st Nanofiltration Stage

| $P_2O_5$ w/w % | TOC ppm | Ca ppm | Fe ppm | Al ppm | Mg ppm | Cd ppm | Cr ppm | $SO_4$ ppm |
|---|---|---|---|---|---|---|---|---|
| 25-45 | 60 | 60 | 50 | 50 | 50 | <1 | 10 | 1500 |

Various commercially available nanofilters may advantageously be used in the process of the present invention, including nanofilters produced by Koch Membranes Systems (e.g., SeIRO), GE Osmonics™ (e.g., DL), DOW™ (FILMTEC™, e.g., NF245), Hydranautics™ (e.g., ESNA), TriSep™ (e.g., TS80), and Applied Membranes Inc (e.g., NF9). Suitable materials of construction may be appreciated by those of skill in the art, and may include polyamides and polysulfones. The cut-off size may be at most 450 dalton, at most 400 dalton, at most 350 dalton, or at most 300 dalton.

While the above-referenced nanofilters are of the spiral wound type, one of ordinary skill in the art may appreciate that other types of nanofilters might be of particular suitability to the process of the instant invention. Such other types of nanofilters may include, by way of example, ceramic nanofilters.

As shown in Table 1, the pre-treated wet phosphoric acid may often be characterized by a high concentration of sulfate ions. While the sulfate concentration in the first permeate may be much reduced with respect to the sulfate concentration in the pre-treated wet phosphoric acid stream, the sulfate concentration in the first permeate may remain undesirably high.

In the inventive process, a barium salt such as barium carbonate may be added to the first permeate in a stirred reactor, to precipitate barium sulfate and thereby appreciably reduce the concentration of remaining sulfate ions in the phosphoric acid. When barium carbonate is used, carbon dioxide is evolved. The product stream, containing barium sulfate solids, may be introduced to a solid/liquid separator, such as a settler. The barium sulfate concentrate is removed in the underflow, and the effluent stream, containing an intermediate purified phosphoric acid, is subsequently delivered at super-osmotic pressure to a second nanofiltration stage (NF2).

We have found that under such conditions, the reject from the second nanofilter may contain virtually all of the excess barium ions, such that the barium concentration in the second permeate may be at most 10 ppm, at most 7 ppm, at most 5 ppm, at most 3 ppm, at most 2 ppm, at most 1.5 ppm, at most 1 ppm, or at most 0.8 ppm, on a 61.5% $P_2O_5$ weight basis. We have further found that under such conditions, the second permeate may also contain a disproportionately reduced concentration of other impurities, with respect to their concentration in the intermediate purified phosphoric acid.

It must be emphasized that one or more additional nanofiltration stages may be added to the process before the barium sulfate precipitation stage (and/or after the second nanofiltration stage) in order to achieve further reductions in impurity concentrations, for example, when the concentration of various impurities in the wet phosphoric acid feed stream is particularly high.

Using the exemplary composition of the first permeate as the actual feed stream, the composition of the second permeate from the second nanofiltration stage is exemplified in Table 3.

TABLE 3

Exemplary Second Permeate Composition -- 2nd Nanofiltration Stage

| $P_2O_5$ w/w % | TOC ppm | Ca ppm | Fe ppm | Al ppm | Mg ppm | Cd ppm | Cr ppm | $SO_4$ ppm |
|---|---|---|---|---|---|---|---|---|
| 25-45 | 40 | 10 | 5 | 5 | 5 | <1 | <1 | 100 |

The second permeate, containing purified phosphoric acid (PPA), may then be introduced to one or more additional nanofiltration stages, or may be otherwise further processed, e.g., concentrated by evaporation in a tertiary stage. More generally, if three or more nanofiltration stages are performed in series, the barium-based sulfate removal process may be disposed (from a process sequence standpoint) after the first nanofiltration stage and prior to the last nanofiltration stage.

The second nanofilter may advantageously remove excess barium (as $Ba^{+2}$) that has not been precipitated as $BaSO_4$. Even for excess barium concentrations of at least 6 ppm, at least 8 ppm, at least 10 ppm, at least 15 ppm, or at least 20 ppm, the barium concentration in the second permeate may be below 5 ppm, below 3 ppm, below 2 ppm, below 1.3 ppm, below 1 ppm, below 0.8 ppm, or below about 0.6 ppm. Typically, the barium concentration may be reduced by a factor of at least 5, at least 7, at least 10, at least 12, at least 15, at least 25, at least 50, or at least 100.

In the inventive process, the TOC content may be reduced by the nanofiltration to various pre-determined levels, e.g., below the maximum TOC value for food-grade phosphoric acid, obviating or reducing the need for various dedicated TOC removal steps (e.g., using activated carbon) known in the art. In addition, prior art processes often employ a decolorization step using peroxide. This decolorization step may be required in those processes due to the introduction of process-specific additives to those processes. The inventive process may obviate or appreciably reduce the need for such a decolorization step.

The removal of impurities by the nanofilters in series, according to the present invention, may produce a PPA having an appreciably higher concentration of phosphoric acid (relative to various known processes) such that the specific evaporation load in the evaporation (tertiary stage) step(s) may be reduced. This may improve energy efficiency and also reduce the characteristic strengthening of the impurity content due to acid concentration via evaporation.

In a further embodiment of this invention, the efficiency of the nanofilters may be enhanced by periodic backwashing. The process is periodically halted and PPA is fed back to the permeate output of the nanofilters and flow is reversed through the nanofilters. This step removes impurities from the nanofilters. Alternatively, the permeate may also be fed back into the nanofilter. The backwashing may be performed after a maximum time of six hours, or within each 4 to 6 hours, each 2 to 6 hours, each 2 to 5 hours, or each 2 to 4 hours of the operation of at least one of the nanofiltration stages We have found that the required minimum backwashing period may be 5 minutes per six hours of operation.

The reject from the nanofilters may still contain a high concentration of $P_2O_5$ by weight, and may be returned to the original feed solution or subjected to further processing.

EXAMPLES

Reference is now made to the following examples, which together with the above description, illustrate the invention in a non-limiting fashion.

Example 1

Using a nanofiltration (NF) system substantially as provided in FIG. 2, the first nanofiltration stage was tested. The nanofilters used were of the spiral wound type. The first nanofiltration stage was operated at approximately 35° C. The feed stream was delivered to the first nanofilter at a pressure of approximately 69 bar.

Chemical analyses of the feed stream and the permeate stream discharged from the first nanofilter are provided in Table 4. The concentration of the phosphoric acid in the permeate, expressed as % $P_2O_5$, is substantially the same as the concentration of the phosphoric acid in the feed. By sharp contrast, the concentration of each (analyzed) impurity in the permeate is appreciably reduced with respect to the respective impurity concentration in the feed.

TABLE 4

| | Stream | Cr ppm | Cd ppm | Mg ppm | Al ppm | Fe ppm | Ca ppm | TOC ppm | $SO_4$ ppm | $P_2O_5$ w/w % |
|---|---|---|---|---|---|---|---|---|---|---|
| Example 1 | Feed | 90 | 10 | 2250 | 2940 | 2360 | 1500 | 250 | 2000 | 44 |
| | Permeate | 5 | <1 | 8 | 3 | 3 | 40 | 40 | 1435 | 43.1 |
| Example 2 | Feed | 5.2 | <1 | 62 | 46 | 91 | 33 | 35 | 1986 | 26.6 |
| | Permeate | 2.5 | <0.5 | 2.8 | 1.7 | 3.6 | 2.2 | 21 | 1395 | 25.1 |
| Example 3 | Feed | 83 | 10.3 | 1790 | 2240 | 1000 | 16 | 289 | 2036 | 39.5 |
| | Permeate | 6 | 1> | 41 | 43 | 20 | 1 | 45 | 1413 | 38.0 |
| Example 4 | Feed | 76 | 9 | 1770 | 2080 | 998 | 20 | 267 | 2200 | 35.7 |
| | Permeate | 5 | 1> | 22 | 23 | 11 | 1> | 30 | 1010 | 35.5 |
| Example 5 | Feed | 62 | 8 | 1530 | 1750 | 810 | 15 | 190 | 1502 | 29.2 |
| | Permeate | 6 | 1> | 78 | 78 | 37 | 1.6 | 42 | 986 | 28.3 |
| Example 6 | Feed | 82 | 10 | 2060 | 2380 | 1080 | 19 | 279 | 1300 | 37.4 |
| | Permeate | 9 | 1 | 115 | 118 | 58 | 2 | 69 | 589 | 36.8 |
| Example 7 | Feed | 60 | 8 | 1600 | 1630 | 800 | 14 | 192 | 1557 | 29.4 |
| | Permeate | 7 | 1> | 75 | 80 | 40 | 4 | 37 | 789 | 27.4 |
| Example 8 | Feed | 83 | 9 | 2170 | 2800 | 2310 | 1400 | 290 | 2410 | 44.3 |
| | Permeate | 6 | <1 | 45 | 45 | 40 | 60 | 60 | 1825 | 43.1 |

Example 2

Using the apparatus described in Example 1, a phosphoric acid feed stream at 25° C. was delivered at a superosmotic pressure of 40 bar to the spiral wound nanofilter. The concentration of the phosphoric acid in the feed, and the concentration of each of the impurities are much lower than their respective concentrations in the feed of Example 1.

Chemical analyses of the feed stream and the permeate stream discharged from the first nanofilter are provided in Table 4. As in Example 1, the concentration of the phosphoric acid in the permeate is lower, but substantially the same as, the concentration of the phosphoric acid in the feed. The concentration of each impurity in the permeate is reduced with respect to the respective impurity concentration in the feed.

Examples 3-6

In each of Examples 3-6, a phosphoric acid feed stream at approximately 40° C. was delivered at a superosmotic pressure of about 60 bar to a spiral wound nanofilter, using an apparatus substantially as described in Example 1. The concentration of the phosphoric acid in the feed, and the concentration of each of the impurities are much lower than their respective concentrations in the feed of Example 1.

For each of these examples, chemical analyses of the feed stream and the permeate stream discharged from the first nanofilter are provided in Table 4.

Example 7

Using the apparatus described in Example 1, a phosphoric acid feed stream at 20° C. was delivered at a superosmotic pressure of 60 bar to the spiral wound nanofilter.

Chemical analyses of the feed stream and the permeate stream discharged from the first nanofilter are provided in Table 4.

Example 8

Using the apparatus described in Example 1, a phosphoric acid feed stream at 35° C. was delivered at a superosmotic pressure of 69 bar to the spiral wound nanofilter.

Chemical analyses of the feed stream and the permeate stream discharged from the first nanofilter are provided in Table 4.

Example 9

Substantially as provided in FIG. 2, the inventive process was operated with first and second nanofiltration stages operating in series, and with a sulfate removal stage being disposed therebetween (from a sequential or process standpoint). However, after reacting the barium carbonate with sulfate in the phosphoric acid to precipitate barium sulfate (and evolving carbon dioxide) in a continuously stirred tank, the discharged stream was filtered (instead of subjecting to a settling step) to remove the barium sulfate containing precipitate. The filtered solution was then introduced as the feed to the second stage of nanofiltration.

While the precipitation stage may be conducted over a wide range of temperatures, we have found that it may be most practical to operate the precipitation stage at a temperature that is close to that of the first permeate, and/or at a temperature that is close to a desired temperature for the second nanofiltration stage. Typically, the operating temperature was in a range of 15° C.-55° C.

The precipitation stage was operated in batch or in semi-batch mode. However, it will be appreciated by those of ordinary skill in the art that particularly in large-scale operations, it may be advantageous to operate the precipitation stage in continuous or in semi-continuous mode.

Examples 10-11

The inventive process was operated with first and second nanofiltration stages operating in series, and with a sulfate removal stage being disposed therebetween, as described in Example 9. The phosphoric acid feed stream was delivered at a temperature of about 30° C. and at a superosmotic pressure of about 60 bar to a spiral wound nanofilter. In the sulfate precipitation stage, barium carbonate was added so as to reduce the sulfate concentration in solution below about 150 ppm (Example 10) or below about 300 ppm (Example 11). Thus, in Example 10, about 2.6 grams $BaCO_3$ were added per kg of feed solution, while in Example 11, about 2.4 grams $BaCO_3$ were added per kg of feed solution.

After precipitation of the sulfate, the resultant solutions ("$2^{nd}$ stage feed") were analyzed. The compositions are provided below in Table 5.

TABLE 5

| stream g/L | $P_2O_5$ w/w % | TOC ppm | Ca ppm | Fe ppm | Al ppm | Mg ppm | Cd ppm | Cr ppm | Ba ppm | F ppm | $SO_4$ ppm |
|---|---|---|---|---|---|---|---|---|---|---|---|
| 1st stage feed | 44.3 | 292 | 1399 | 2310 | 2800 | 2170 | 8.7 | 83 | n.d. | 295 | 2600 |
| 1st stage permeate | 43.1 | 59.2 | 60 | 40 | 45 | 44 | 1> | 2 | n.d. | 121 | 1445 |
| Example 10: 2nd stage feed | 43.5 | 60 | 53.6 | 40 | 45 | 44 | <1 | 2 | 3.4 | 125 | 148 |
| Example 12: 2nd stage permeate | 43.4 | 45 | 10 | 4 | 4 | 6 | <1 | <1 | <1 | 100 | 136 |
| Example 11: 2nd stage feed | 41.8 | 49.4 | 51.5 | 40 | 45 | 44 | <1 | 2 | 2.2 | 130 | 260 |
| Example 13: 2nd stage permeate | 42.6 | 40 | 10 | 4 | 4 | 10 | <1 | <1 | <1 | 115 | 246 |

Examples 12-13

After precipitation of the sulfate in Examples 10 and 11, the sulfate-depleted solutions, containing relatively high concentrations of excess $Ba^{+2}$, were fed to a spiral wound nanofilter of the second nanofiltration stage, at a superosmotic pressure of about 60 bar. The permeates obtained from this $2^{nd}$ stage of nanofiltration (Example 11 being the permeate resulting from the sulfate-depleted solution obtained in Example 10; Example 13 being the permeate resulting from the sulfate-depleted solution obtained in Example 12) were analyzed. The compositions are provided in Table 5.

It may be seen that the concentration of various impurities was reduced by half an order of magnitude ($Ca^{+2}$, $Mg^{+2}$) to an order of magnitude ($Fe^{+3}$, $Al^{+3}$). The concentration of TOC was slightly reduced, while the sulfate concentration was largely unaffected.

The inventors have found that the addition of $Ba^{+2}$ may advantageously reduce the level of dissolved sulfate to achieve a pre-determined level of dissolved sulfate. The concentration of dissolved sulfate achieved may be below the specification for food grade phosphoric acid (150 ppm). Perhaps more significantly, the inventors have found that the resultant, sulfate-depleted solution may be introduced to a $2^{nd}$ stage of nanofiltration, in which excess barium values may be appreciably reduced in a robust manner, to achieve a pre-determined level of dissolved barium, and more specifically, to achieve a level of dissolved barium below 1 ppm, the level currently required in the Specification for Food Grade Phosphoric Acid.

In Examples 12 and 13, the concentration of barium ion was reduced below 1 ppm. In similar runs, the barium ion concentration was reduced from as much as 7 ppm or as much as 10 ppm, to a concentration of less than 1 ppm, less than 0.8 ppm, or less than 0.7 ppm in the $2^{nd}$ permeate, on a 61.5% $P_2O_5$ basis (i.e., after concentrating the acid to 61.5% $P_2O_5$).

Examples 14-16

The inventive process was operated with first and second nanofiltration stages operating in series, and with a sulfate removal stage being disposed therebetween, as described in Example 9. Three different $1^{st}$ permeate solutions were used (Examples 14-16). In the sulfate precipitation stage, barium carbonate was added to precipitate out barium sulfate; carbon dioxide was evolved. In each of Examples 14-16, the solutions obtained from the sulfate precipitation stage were subjected to the second stage of nanofiltration operating at 20-35° C. and at 60 bar.

The compositions of the $1^{st}$ permeate solutions, and the $2^{nd}$ permeate solutions resulting therefrom, are provided below in Table 6.

Example 17

Table 7 summarizes the compositional results for a single run, substantially according to the process scheme provided in FIG. 2, using the barium sulfate precipitation and removal procedure described in Example 9. Table 7 provides the composition of the feed stream to the first stage of nanofiltration and the composition of the resultant first permeate (Example 8). To this first permeate, barium carbonate was added, precipitating barium sulfate. After filtering off the barium sulfate solids, the filtrate obtained was analyzed (Example 17). This filtrate was then delivered (T=30° C.; P=60 bar) to the second stage of nanofiltration; the composition of the resultant second permeate was provided in Table 6 (Example 16).

The second permeate obtained in Example 16 was then concentrated by evaporation at atmospheric pressure to obtain a product containing at least 61.5% phosphoric acid (expressed as $P_2O_5$), the minimum concentration for food grade phosphoric acid. In this case, over-evaporation resulted in a final concentration of 61.5% $P_2O_5$, well above the required concentration.

TABLE 6

Experimental Results from 2nd Nano-filtration

| | Stream | Cr ppm | Cd ppm | Mg ppm | Al ppm | Fe ppm | Ca ppm | TOC ppm | $SO_4$ ppm | Ba ppm | $P_2O_5$ w/w % |
|---|---|---|---|---|---|---|---|---|---|---|---|
| Example 14 | 1st permeate | 6 | 1> | 40 | 30 | 30 | 130 | 60 | 1500 | N.D. | 41.6 |
| | 2nd permeate | 1> | 1> | 1 | 0.3 | 1 | 10 | 40 | 120 | 0.8 | 41.4 |
| Example 15 | 1st permeate | 7 | 1> | 35 | 5 | 37 | 130 | 55 | 3000 | N.D. | 42.3 |
| | 2nd permeate | 1> | 1> | 1 | 1> | 1> | 12 | 40 | 165 | 1> | 42.1 |
| Example 16 | 1st permeate | 6 | 1> | 45 | 45 | 32 | 60 | 45 | 2200 | N.D. | 43.1 |
| | 2nd permeate | 1> | 1> | 5 | 4 | 4 | 10 | 35 | 98 | 0.7 | 43.6 |

The concentrations of the various major impurities in the obtained concentrate may be compared with the maximum allowed values for food grade phosphoric acid (provided in Table 7). The comparison indicates that the concentrations of the various major impurities in the obtained concentrate are equivalent to, below, or significantly below the levels allowed by the food grade acid specification.

TABLE 7

| | Stream | Cr ppm | Cd ppm | Mg ppm | Al ppm | Fe ppm | Ca ppm | TOC ppm | $SO_4$ ppm | Ba ppm | $P_2O_5$ w/w % |
|---|---|---|---|---|---|---|---|---|---|---|---|
| Example 8 | Feed | 83 | 9 | 2170 | 2800 | 2310 | 1400 | 290 | 2410 | N.D. | 44.3 |
| | $1^{st}$ Permeate | 6 | <1 | 45 | 45 | 40 | 60 | 60 | 1825 | N.D. | 43.1 |
| Example 17 | Filtrate | 6 | <1 | 42 | 45 | 45 | 58 | 65 | 105 | 6.3 | 43.2 |
| Example 16 | $2^{nd}$ Permeate | <1 | <1 | 5 | 4 | 4 | 10 | 35 | 98 | <1 | 43.6 |
| Example 17 | Concentrate | <1 | <1 | 8 | 5 | 5 | 15 | 49 | 137 | <1 | 65.1 |
| Specification - Food Grade Acid[1] | | 2 | 1 | 20 | 5 | 5 | 20 | 70 | 150 | 1 | 61.5 (min) |

[1]maximum concentration, unless otherwise indicated

Examples 18-20

Using a nanofiltration system and operating conditions substantially as described with respect to Examples 1-8, the first nanofiltration stage was tested. Chemical analyses of the feed stream and the permeate stream discharged from the first nanofilter are provided in Table 8. The concentration of the phosphoric acid in the permeate, expressed as % $P_2O_5$, is substantially the same as the concentration of the phosphoric acid in the feed. By sharp contrast, the concentration of each (analyzed) impurity in the permeate is appreciably reduced with respect to the respective impurity concentration in the feed.

Examples 21-22

Table 9 provides the compositional results for two single runs, substantially according to the process scheme provided in FIG. 2, using the barium sulfate precipitation and removal procedure described in Example 9. Table 8 provides the composition of the feed stream to the first stage of nanofiltration and the composition of the resultant first permeate (Examples 18, 20). To this first permeate, barium carbonate was added, precipitating barium sulfate. After filtering off the barium sulfate solids, the filtrate obtained was analyzed. This filtrate (or "second feed") was then delivered (T=30° C.; P=60 bar) to the second stage of nanofiltration; the compositions of each filtrate, and the second permeate (or "second nanofiltration product") produced therefrom, are provided in Table 9.

containing, but not limited to, a wide variety of impurities, including sulfate, metallic impurities, TOC, fluoride, and arsenic.

The instant process has been experimentally proven on phosphoric acid streams containing as much as 60% phosphoric acid, and on relatively dilute streams containing as little as 7.5-15% phosphoric acid. The inventors have found that for a fixed ratio of impurities to phosphoric acid concentration, treatment efficacy (evaluated according to the impurity concentration in the last permeate divided by the impurity concentration in the feed stream to the first nanofiltration stage, the concentrations being normalized by the $P_2O_5$ concentrations in the permeate and feed, respectively) may be largely independent of phosphoric acid concentration. However, with increasing $P_2O_5$ concentration, the increase in viscosity may appreciably lower throughput through the nanofilters.

The concentration of sulfate in the feed stream has been found to be an important process parameter. The instant process has been experimentally proven on phosphoric acid feed streams having a sulfate concentration as low as about 10 ppm and 15 ppm, and as high as about 150 ppm, per each 1 percent weight of $P_2O_5$ in the feed stream. The inventors believe that higher concentrations of sulfate are treatable using the inventive process, with a larger amount of the sulfate being rejected in the nanofiltration performed prior to the sulfate removal stage, and with a higher concentration of barium carbonate being introduced to precipitate out the additional sulfate values as barium sulfate, such that the final

TABLE 8

| Stream | | Cr ppm | Cd ppm | Mg ppm | Al ppm | Fe ppm | Ca ppm | TOC ppm | $SO_4$ ppm | $P_2O_5$ w/w % |
|---|---|---|---|---|---|---|---|---|---|---|
| Example 18 | Feed | 67.8 | 10 | 2426 | 3168 | 2624 | 1980 | 319 | 2696 | 7.6 |
|  | Permeate | <1 | <1 | 10 | 10 | 10 | 32.4 | 55 | 1712 | 7.4 |
| Example 19 | Feed | 108 | 11.5 | 2753 | 3660 | 6094 | 1217 | 262 | 4113 | 18.1 |
|  | Permeate | 7.5 | 6.1 | 107 | 58 | 244 | 292 | 64 | 2715 | 18 |
| Example 20 | Feed | 97 | 10.4 | 2223 | 1771 | 3916 | 823 | 406 | 3766 | 59.7 |
|  | Permeate | <1 | 3.0 | 68 | 19 | 36 | 144 | 76 | 2612 | 59.6 |

TABLE 9

| | | $P_2O_5$ w/w % | TOC ppm | Ca ppm | Fe ppm | Al ppm | Mg ppm | Cd ppm | Cr ppm | Ba ppm | $SO_4$ ppm |
|---|---|---|---|---|---|---|---|---|---|---|---|
| Example 21 | 2nd feed | 7.5 | 50 | 30 | 12 | 15 | 8 | <1 | <1 | 8 | 15 |
|  | 2nd NF product | 7.6 | 25 | 2.0 | <1 | <1 | <1 | <1 | <1 | <1 | 17 |
| Example 22 | 2nd feed | 59.4 | 70 | 84 | 54 | 27 | 54 | 5 | 8.8 | 2 | 147 |
|  | 2nd NF product | 59.5 | 36.6 | 6.3 | 5.6 | 2.1 | 5.1 | <1 | <1 | <1 | 102 |

It must be emphasized that, as disclosed hereinabove, one or more additional nanofiltration stages may be added to the process after the second nanofiltration stage in order to achieve further reductions in impurity concentrations, as necessary.

Based on the experimental runs described above, and further based on the results of a broader study of the process and process parameters, the inventors have invented a phosphoric acid purification process that may be applied to a wide variety of phosphoric acid streams, containing 2-62% phosphoric acid, (expressed as a percent weight of $P_2O_5$); concentration of sulfate may be controlled below 250 ppm, below 200 ppm, below 160 ppm, below 140 ppm, below 120 ppm, or below 100 ppm.

The instant process has proven to be particularly efficient in removing iron, aluminum, calcium, magnesium, and chromium, which often represent the set of major metallic impurities in the feed stream. The instant process has been proven on phosphoric acid feed streams having a total concentration of these major metallic impurities as low as about 6 ppm, and as high as about 450 ppm, per each 1 percent weight of $P_2O_5$ in the feed stream.

We have discovered that the flux through the system may approximately double for every increase of 15° C. in the operating temperature. Thus, while the temperature across each nanofilter may be at least 15° C., at least 20° C., or at least 25° C., the maximum temperature across each nanofilter may be at most 35° C., at most 40° C., at most 45° C., at most 50° C., at most 55° C., or at most 60° C. Above 60° C., the deterioration of the nanofilters may be greatly accelerated.

As used herein in the specification and in the claims section that follows, the unit of pressure "bar" refers to bar gage.

As used herein in the specification and in the claims section that follows, the term "metallic impurities" and the like is meant to specifically include metal ions. In many cases, the "metallic impurities" are predominantly metal ions, or are substantially consist of metal ions.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

What is claimed is:

1. A method of purifying phosphoric acid comprising:
   (a) providing a pre-treated wet phosphoric acid feed containing:
      (i) 2-62% phosphoric acid, expressed as a percent weight of $P_2O_5$ in said feed;
      (ii) a sulfate concentration of at least 15 ppm, per each 1 percent weight of said $P_2O_5$ in said feed; and
      (iii) metallic impurities including iron, aluminum, calcium, magnesium, and chromium, a total feed concentration of said iron, aluminum, calcium, magnesium, and chromium being at least 10 ppm, per each 1 percent weight of said $P_2O_5$ in said feed;
   (b) subjecting said pre-treated wet phosphoric acid feed to a first nanofilter in at least a first nanofiltration stage, to obtain a first permeate and a first reject;
   (c) treating said first permeate to produce sulfate solids in a partially treated phosphoric acid stream;
   (d) removing at least a portion of said solids from said phosphoric acid stream to produce a sulfate-depleted phosphoric acid stream; and
   (e) subjecting said sulfate-depleted phosphoric acid stream to at least a second nanofilter in at least one additional nanofiltration stage, to obtain a purified phosphoric acid in a second permeate, and a second reject, said second permeate containing:
      (i) a concentration of 2-62% phosphoric acid, expressed as a percent weight of $P_2O_5$ in said second permeate;
      (ii) a sulfate concentration of less than 10 ppm per each 1 percent weight of said $P_2O_5$ in said second permeate; and
      (iii) metallic impurities including iron, aluminum, calcium, magnesium, and chromium, a total concentration of said iron, aluminum, calcium, magnesium, and chromium in said second permeate being at most 5 ppm, per each 1 percent weight of said $P_2O_5$ in said second permeate.

2. The method of claim 1, said pre-treated wet phosphoric acid feed further containing a total organic carbon concentration of at least 5 ppm, per each 1 percent weight of $P_2O_5$ in said feed.

3. The method of claim 1, said purified phosphoric acid further containing metallic impurities, said total concentration of said iron, aluminum, calcium, magnesium, and chromium being at most 4 ppm per each 1 percent weight of $P_2O_5$ in said second permeate.

4. The method of claim 1, said purified phosphoric acid further containing a total organic content concentration of at most 3 ppm per each 1 percent weight of $P_2O_5$ in said second permeate.

5. The method of claim 1, said treating including contacting said first permeate with a barium salt to precipitate said sulfate solids.

6. The method of claim 5, said barium salt including barium carbonate.

7. The method of claim 5, said second permeate containing at most 0.05 ppm of barium, per each 1 percent weight of $P_2O_5$ in said second permeate.

8. The method of claim 1, an operating temperature of said first and second nanofiltration stages being within a range of 20° C. to 60° C.

9. The method claim 1, at least one of said first and said at least one additional nanofiltration stages being operated at a pressure within a range of 30 to 80 bar.

10. The method of claim 1, said pre-treated wet phosphoric acid feed containing at least 20% of said $P_2O_5$, by weight.

11. The method of claim 1, said purified phosphoric acid containing at least 20% of said $P_2O_5$, by weight.

12. The method of claim 1, further comprising performing a backwashing operation on at least one of said first nanofilter and said second nanofilter.

13. The method of claim 1, further comprising returning said first reject to a process step prior to step (b).

14. The method of claim 1, further comprising returning said second reject to a process step prior to step (d).

15. The method of claim 7, a composition of said pre-treated wet phosphoric acid feed containing 20-60% of said $P_2O_5$, and at least one of: 1000 to 3000 ppm of said calcium, 1000 to 3000 ppm of said magnesium, 1000 to 4000 ppm of said aluminum, 1000 to 3000 ppm of said sulfate, 100 to 500 ppm of said total organic carbon, 500 to 3000 ppm of said iron, and 50 to 500 ppm of said chromium.

16. The method of claim 7, said second permeate containing 30-55% of said $P_2O_5$, and at most 15 ppm of said calcium, at most 15 ppm of said magnesium, at most 3 ppm of said aluminum, and at most 120 ppm of said sulfate.

17. The method of claim 7, said second permeate containing at least one of: at most 4 ppm iron, at most 2 ppm chromium, and at most 1 ppm cadmium.

18. The method of claim 7, said sulfate concentration of said second permeate being at least 1 ppm per each 1 percent weight of $P_2O_5$ in said second permeate.

19. The method of claim 5, wherein said phosphoric acid stream contains barium ions, and wherein said subjecting of said phosphoric acid stream to at least said second nanofilter is performed so as to selectively reject to said second reject, with respect to said second permeate, said barium ions.

20. A method of purifying phosphoric acid comprising:
   (a) providing a pre-treated wet phosphoric acid feed containing:
      (i) 20-62% phosphoric acid, expressed as a percent weight of $P_2O_5$ in said feed;

(ii) a sulfate concentration of at least 15 ppm, per each 1 percent weight of said $P_2O_5$ in said feed; and (iii) metallic impurities including iron, aluminum, calcium, magnesium, and chromium, a total feed concentration of said iron, aluminum, calcium, magnesium, and chromium being at least 10 ppm, per each 1 percent weight of said $P_2O_5$ in said feed;

(b) subjecting said pre-treated wet phosphoric acid feed to a first nanofilter in at least a first nanofiltration stage, to obtain a first permeate and a first reject;

(c) treating said first permeate with a barium salt to produce sulfate solids in a partially treated phosphoric acid stream;

(d) removing at least a portion of said solids from said phosphoric acid stream; and (e) subjecting said phosphoric acid stream to at least a second nanofilter in at least one additional nanofiltration stage, to obtain a purified phosphoric acid in a second permeate, and a second reject, said second permeate containing:

(i) a concentration of 20-62% phosphoric acid, expressed as a percent weight of $P_2O_5$ in said second permeate;

(ii) a sulfate concentration of less than 10 ppm per each 1 percent weight of said $P_2O_5$ in said second permeate; and (iii) metallic impurities including iron, aluminum, calcium, magnesium, and chromium, a total concentration of said iron, aluminum, calcium, magnesium, and chromium in said second permeate being at most 5 ppm, per each 1 percent weight of said $P_2O_5$ in said second permeate;

said second permeate containing at most 0.05 ppm of barium, per each 1 percent weight of $P_2O_5$ in said second permeate.

* * * * *